J. M. MacDONALD.
METHOD OF MOLDING AND ORNAMENTING PLASTIC SUBSTANCES.
APPLICATION FILED FEB. 14, 1917.
1,301,069.
Patented Apr. 15, 1919.
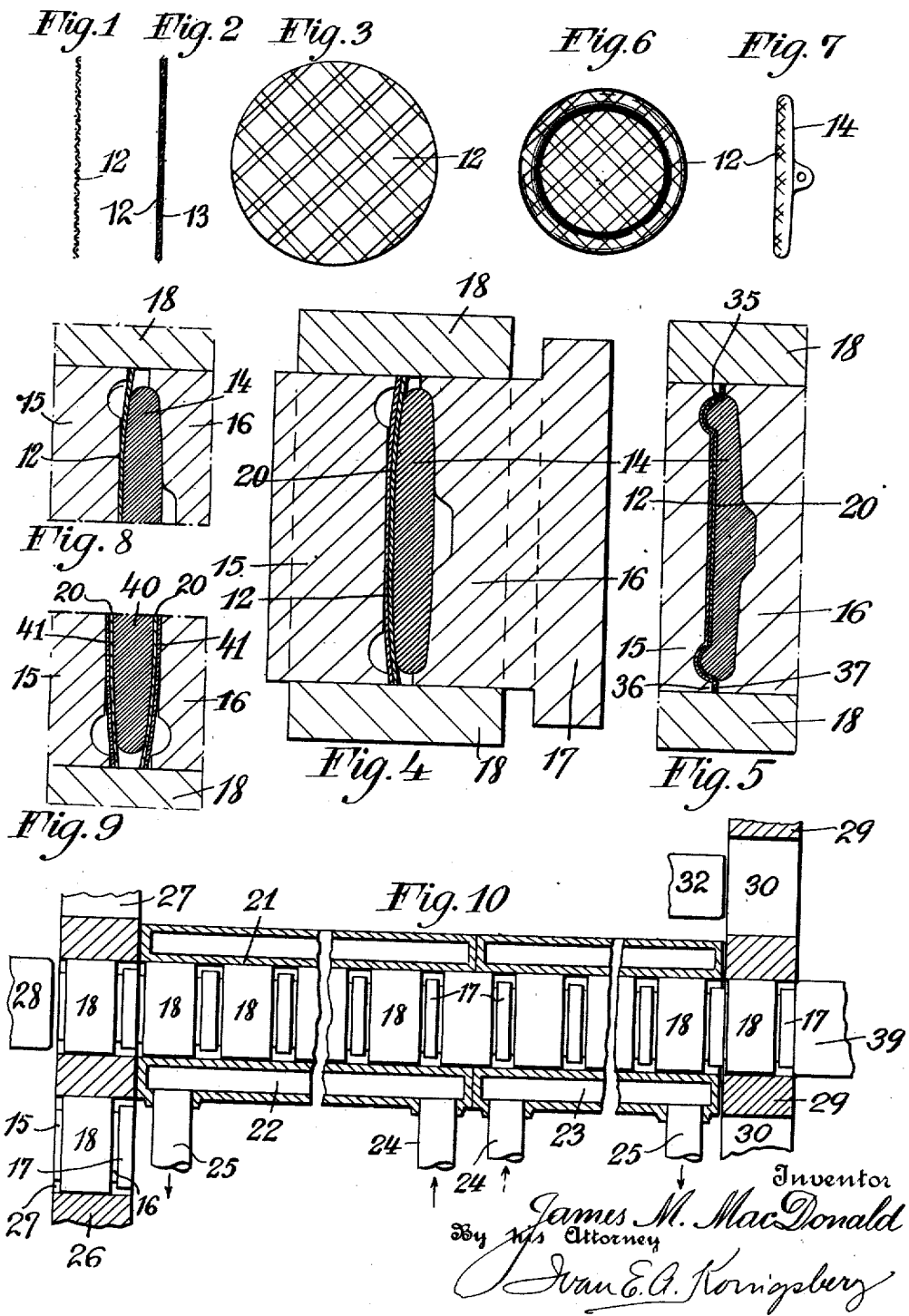

UNITED STATES PATENT OFFICE.

JAMES M. MacDONALD, OF EAST ORANGE, NEW JERSEY.

METHOD OF MOLDING AND ORNAMENTING PLASTIC SUBSTANCES.

1,301,069.  Specification of Letters Patent.  Patented Apr. 15, 1919.

Application filed February 14, 1917. Serial No. 148,527.

*To all whom it may concern:*

Be it known that I, JAMES M. MACDONALD, a citizen of the United States, and resident of East Orange, in the county of Essex and State of New Jersey, have invented certain new and useful Improvements in Methods of Molding and Ornamenting Plastic Substances, of which the following is a specification.

The object of my invention is to provide an improved method for molding plastic substances and ornamenting them while they are being molded. More specifically it is the object of my invention to mold a suitable plastic substance into the form of a button and ornamenting the latter by a suitable ornamental covering or design. Another object of the invention is the production of an ornamental molded article as a new article of manufacture according to my improved method. Other objects will appear as this specification proceeds, while reference is had to the accompanying drawing in which I have illustrated the several steps in my improved method with reference to the making of buttons. The invention is, however, not limited to the making of buttons but contemplates the production of other articles as well. For instance, chips for use in playing games of cards, checks, badges, plaques, ash trays and numerous other articles.

My invention contemplates the use of a suitable fabric material as a means of ornamentation, though I do not wish to limit myself to the use of fabrics as I have practised my invention successfully by ornamenting the molded article with an ornamented paper covering.

Briefly stated my invention comprises the impregnation of the ornamental covering material with a suitable solution which when baked or heated and compressed acquires a high luster and also acts as a binder. A suitable phenolic combination such as carbolic acid and formaldehyde, may be used for this purpose. I then take a mold and fill the same with the substance of which the finished article is to be made, said substance being preferably prepared in tablet form. I then place the impregnated covering material adjacent the said tablet and close the mold. By the application of heat and pressure and subsequent chilling or cooling, the fabric and the tablet unite by compression to form the finished ornamented article desired. As examples of the substances adapted for practice with my invention may be named bakelite, condensite and the like. The several steps in my improved method and an apparatus for practising the same are illustrated in the accompanying drawing in which—

Figure 1 is a sectional view of a fabric to be used for ornamenting the article;

Fig. 2 is a similar view of the impregnated fabric;

Fig. 3 is a face view of the fabric;

Fig. 4 is a sectional view of the mold containing the tablet of plastic substance and the fabric ready for compression;

Fig. 5 is a similar sectional view showing the compression completed;

Figs. 6 and 7 are respectively face and edge views of the finished article;

Figs. 8 and 9 illustrate modifications for ornamenting the articles in a different manner from that shown in Fig. 4; and Fig. 10 illustrates an apparatus for practising my improved method.

With respect to the molding of the substance itself, I refer to my pending applications Serial Numbers 107,751 and 133,839, for a more detail description than is required for the purpose of this disclosure.

The reference numeral 12 designates a suitable fabric to be used as an ornamental covering for the finished article, in this instance a button. I may use any fabric for this purpose such as plain or fancy silks, cottons, printed goods or other fabrics suitable for ornamental purposes, or for the purpose of matching a dress or suit with decorated or ornamented buttons. I may also use an embroidered fabric. In carrying out my process I cut a piece of the fabric in such shape and size as may be required for the particular button I wish to make and impregnate the same, as by dipping, with a suitable solution indicated at 18 in the drawing by sectional lines. If the button is to be made of bakelite I prefer to use a solution thereof for impregnating the fabric.

The substance referred to is prepared in suitable preliminary form, as tablets or granules for instance, and in Fig. 4 I have shown a tablet 14 which is placed in a mold comprising the molding members 15 and 16, the latter having a spacing portion 17. The ring or annular member 18 completes the mold. Before closing the mold I place the ornamental covering element 12 therein next to the tablet 14. If the fabric is of light color or very thin it is advantageous and in some instances quite necessary, to employ a disk of light colored cardboard 20 or other opaque or nearly opaque material between the fabric and the substance to form a background for the fabric and prevent the color of the substance from appearing through the fabric to tone down the shade of the latter. In the case of bakelite it is more economical to use the background member, than to employ a light colored bakelite. The mold members 15 and 16 are of course shaped to produce the required form of article as shown.

Each mold forms a unit and a plurality of such units are placed within a tube 21, see Fig. 10, provided with a steam jacket 22 and a water jacket 23 provided with supply pipes 24, 24, and outlets 25, 25 respectively. The units are placed in alinement with the tube by a feeding means represented at 26 having compartments 27 into which the filled units are placed by the operator. 28 represents a suitable compressing member, such as a plunger, which is operated to ram the units into and through the tube. At the other end there is a removing means 29 having compartments 30 for receiving the units from the tube 21. 32 represents an ejecting means for ejecting the units. 39 is an abutment. The detailed operation and construction of the apparatus is set forth in the application Serial Number 133,839 referred to above.

In passing through the tube, the tablets 14 become plastic under the influence of the heat in jacket 22. At the same time they are subjected to the continued hammering operation of the plunger 28 whereby the substance after it has become plastic is compressed and formed in the mold together with the cardboard and fabric as illustrated in Fig. 5. The solution in the fabric also softens by the heat and is partly forced into the cardboard, while on the other side of the latter the plastic substance in similar manner partly penetrates the cardboard, the result being that the fabric, cardboard and tablet are united into a whole with the several elements firmly bound to each other, after which the completely molded and ornamented article passes into the chilled area of the tube and is cooled and "set." After ejection, the buttons may be polished and the "bur" 35, see Fig. 5, which forms between the "lands" or shoulders 36 and 27 of the dies or molds, is removed.

The finished product as shown in Figs. 6 and 7, is that of a button or other article covered with the fabric 12 which extends more or less over the edge according to the shape of the mold as is obvious. I have found that the fabric becomes so firmly bound to the button that it is very difficult if not impossible, to scratch it off with a knife or like instrument. And considering the ordinary wear and usage to which buttons are subjected, it may be said the fabric is inseparably united with the substance.

In case a dark or heavy fabric is used or when it is immaterial whether or not its color is darkened, the cardboard may be omitted as shown in Fig. 8, which illustrates the simplest form of my invention, that of making a button of a plastic substance with a covering pure and simple. Again, as shown, in Fig. 9, I may cover both sides of the article 40 by a covering 41 and interpose cardboards 20, 20 or of course omit them as in Fig. 8.

The finished button or other article is very superior to covered buttons made according to other methods. The fabric being thoroughly saturated with the solution acquires a high luster and the process imparts superior wearing qualities thereto. Moisture or heat has no influence on the fabric thus treated.

It will also be observed that the scope of the art of making fancy buttons is greatly enlarged by my invention. Thus, buttons may be made with special designs on paper and treated as set forth above with the like result, where ordinarily it would be impossible to use paper for this purpose. I therefore claim not only fabrics, but any other material which may be found suitable for the purpose.

The ornamented and molded article produced by the process herein is distinguished from other similar articles by the fact that the covering material is impregnated with and the face portions of the article consist of materials or substances adapted to be united by an autogenic process such as described, although as a matter of fact one of the materials is different from the other.

I claim.

1. As a new article of manufacture, a button comprising a body portion and a fabric covering impregnated with a solution of the substance of which said body portion consists for securing the said fabric covering to the said body portion.

2. As a new article of manufacture, a button composed of a condensation product of phenol and formaldehyde and a fabric covering impregnated with a solution of the product and secured to said body portion.

3. As a new article of manufacture, a button composed of a condensation product of phenol and formaldehyde, a fabric covering impregnated with a solution of the said product, a member forming a background for said fabric covering interposed between the latter and said body portion, the said three elements being united to form a button with a fabric covering.

Signed at New York in the county of New York and State of New York this 30th day of January A. D. 1917.

JAMES M. MacDONALD.

Certificate of Correction.

It is hereby certified that Letters Patent No. 1,301,069, granted April 15, 1919, upon the application of James M. MacDonald, of East Orange, New Jersey, for an improvement in "Methods of Molding and Ornamenting Plastic Substances," were erroneously issued to the inventor, said MacDonald, whereas said Letters Patent should have been issued to *Plastics Development Company, a Corporation of New Jersey*, said corporation being assignee of the *entire interest* in said invention, as shown by the records of assignments in this Office; and that the said Letters Patent should be read with this correction therein that the same may conform to the record of the case in the Patent Office.

Signed and sealed this 15th day of July, A. D. 1924.

[SEAL.] THOMAS E. ROBERTSON,
*Commissioner of Patents.*